US006256992B1

United States Patent
Lewis, Jr. et al.

(10) Patent No.: US 6,256,992 B1
(45) Date of Patent: Jul. 10, 2001

(54) SYSTEM AND METHOD FOR CONTROLLING A TURBOCHARGER TO MAXIMIZE PERFORMANCE OF AN INTERNAL COMBUSTION ENGINE

(75) Inventors: Spencer C. Lewis, Jr., Mt. Pleasant, SC (US); Peter Rauznitz, Columbus, IN (US); Mark W. Pyclik, Bloomington, IN (US); Joseph F. Mohos, Columbus, IN (US); W. Barry Bryan, Franklin, IN (US)

(73) Assignee: Cummins Engine Company, Inc., Columbus, IN (US)

( * ) Notice: Subject to any disclaimer, the term of this patent is extended or adjusted under 35 U.S.C. 154(b) by 0 days.

(21) Appl. No.: 09/085,202

(22) Filed: May 27, 1998

(51) Int. Cl.[7] .................................................... F02D 23/00
(52) U.S. Cl. .............................................. 60/603; 60/611
(58) Field of Search ............................. 60/601, 602, 603, 60/611; 123/198 DB (56) References Cited

U.S. PATENT DOCUMENTS

| | | |
|---|---|---|
| 3,096,614 | 7/1963 | Silver et al. . |
| 4,157,701 * | 6/1979 | Holtrop et al. ............... 123/198 DB |
| 4,174,617 | 11/1979 | Jalali-Karchay ........................ 60/602 |
| 4,392,352 | 7/1983 | Stumpp et al. ........................ 60/602 |
| 4,515,136 | 5/1985 | Cholvin et al. . |
| 4,572,130 | 2/1986 | Tsukamoto et al. .................. 123/357 |
| 4,621,600 | 11/1986 | Hasegawa ............................ 123/357 |
| 4,691,521 | 9/1987 | Hirabayashi et al. . |
| 4,703,625 | 11/1987 | Caldwell ................................ 60/602 |
| 4,714,068 | 12/1987 | Nagase et al. ........................ 123/506 |
| 4,719,887 | 1/1988 | Schmid et al. ........................ 123/383 |
| 4,953,110 | 8/1990 | Chartrand ............................. 364/550 |
| 5,036,663 | 8/1991 | Akagi et al. ........................... 60/612 |
| 5,050,452 | 9/1991 | Morioka ................................. 74/858 |
| 5,142,868 | 9/1992 | Woon et al. ........................... 60/624 |
| 5,174,259 | 12/1992 | Shinzawa ............................. 123/357 |
| 5,211,010 * | 5/1993 | Hirota ..................................... 60/280 |
| 5,377,112 | 12/1994 | Brown, Jr. et al. ............. 364/431.12 |
| 5,526,266 | 6/1996 | Rutan et al. ..................... 364/431.02 |
| 5,605,044 | 2/1997 | Zimmer et al. ........................ 60/602 |
| 5,832,895 * | 11/1998 | Takahashi et al. ................... 123/350 |

FOREIGN PATENT DOCUMENTS

| | | |
|---|---|---|
| 57-48826 | 4/1982 | (JP) . |
| 58-180191 | 11/1983 | (JP) . |
| 59-20525 | 2/1984 | (JP) . |
| 59-160028 | 9/1984 | (JP) . |
| 110832 * | 4/1989 | (JP) . |
| 2-218829 | 8/1990 | (JP) . |
| 280364 * | 10/1993 | (JP) . |

* cited by examiner

Primary Examiner—Noah P. Kamen
(74) Attorney, Agent, or Firm—Woodard, Emhardt, Naughton, Moriarty & McNett (57) ABSTRACT

The present invention relates to a system and method for managing the operation of a turbocharger and is responsible for controlling the turbocharger to cause a desired air mass flow to be provided to the engine and for protecting the turbocharger from excessive shaft speed and excessive turbine inlet temperature. The protection modes have higher priority than the performance control. First, turbocharger shaft speed is checked against a programmable limit, and the turbocharger is adjusted to bring the speed under control if its speed exceeds this limit. If the speed is not above the limit, the turbine inlet temperature is checked against a second programmable limit. If the turbocharger inlet temperature is above the predetermined limit, the turbocharger is adjusted to bring the inlet temperature under control. If, after either of these adjustments are made, the predetermined limits are still exceeded by the turbocharger, then the system invokes a derating of the fueling to the engine in order to protect the turbocharger. If none of the limits have been exceeded, then the system operates the turbocharger to provide the desired air mass flow to the engine in order to maximize engine performance.

15 Claims, 4 Drawing Sheets

SYSTEM AND METHOD FOR CONTROLLING A TURBOCHARGER TO MAXIMIZE PERFORMANCE OF AN INTERNAL COMBUSTION ENGINE

TECHNICAL FIELD OF THE INVENTION

The present invention generally relates to engine control systems and, more particularly, to a system and method for controlling a turbocharger to maximize performance of an internal combustion engine.

BACKGROUND OF THE INVENTION

The use of turbochargers to increase the horsepower and torque of an internal combustion engine is well known in the art. With the addition of an exhaust-driven turbocharger, a relatively small, fuel-efficient engine can be used in a vehicle to provide economical operation during normal driving while providing additional horsepower and torque during acceleration and/or full-throttle operation.

A turbocharger includes a compressor and a turbine. The turbine drives the compressor with exhaust energy created by the internal combustion engine. The engine exhaust drives a turbine wheel in the turbine of the turbocharger and is discharged through an exhaust system. The turbine wheel drives a shaft connected to a compressor wheel in the compressor which pressurizes intake air, previously at atmospheric pressure, and forces it typically through an intercooler and over a throttle valve and into an engine intake manifold. Controlling the output of the turbocharger to obtain desired engine operation has been a long-standing problem. Too much output can create erratic engine performance and permanently damage engine components. Too little output causes engine hesitation, loss of power, and inefficient operation. Additionally, changes in atmospheric pressure, ambient temperature, and engine speed affect the overall efficiency of the turbocharger, which directly affects the performance, power output, and fuel economy of the engine.

In most, if not all, exhaust-driven turbocharger installations, a wastegate is employed to limit the maximum boost pressure developed by the turbocharger. Turbocharger speed regulation is achieved by diverting a portion of the exhaust gases through a wastegate instead of permitting all of the exhaust gases to pass through the turbine. Typically, the wastegate comprises a valve disposed in the exhaust flow path and an actuator for moving the valve. The actuator moves the valve between opened and closed positions in response to boost pressure. In the open position, the flow of the exhaust gases is diverted around the turbine housing whereas in the closed position, all of the exhaust gas travels through the turbine housing.

Prior art turbocharger systems are prone to certain failures. One of the principal sources of failure is overspeed of the turbine rotor assembly; that is, the turbine is rotated at revolutions per minute (RPM) higher than that for which the turbocharger is designed. Additionally, because the turbocharger is typically mounted near the exhaust manifold of the engine in order to efficiently receive exhaust gases for turning the turbine, the turbocharger is prone to overheating if its temperature is not regulated in some manner. If any of these conditions are left to exist for too long a period, the turbocharger will ultimately destroy itself There is therefore a need for a system and method for controlling a turbocharger which allows the turbocharger to deliver the appropriate air mass flow to the engine to maximize engine performance and, at the same time, protects the turbocharger from excessive shaft speed and excessive turbine inlet temperature. The present invention is directed toward meeting these needs.

SUMMARY OF THE INVENTION

The present invention relates to a system and method for managing the operation of a turbocharger and is responsible for controlling the turbocharger to cause a desired air mass flow to be provided to the engine and for protecting the turbocharger from excessive shaft speed and excessive turbine inlet temperature. The protection modes have higher priority than the performance control. First, turbocharger shaft speed is checked against a programmable limit, and the turbocharger is adjusted to bring the speed under control if its speed exceeds this limit. If the speed is not above the limit, the turbine inlet temperature is checked against a second programmable limit. If the turbocharger inlet temperature is above the predetermined limit, the turbocharger is adjusted to bring the inlet temperature under control. If, after either of these adjustments are made, the predetermined limits are still exceeded by the turbocharger, then the system invokes a derating of the fueling to the engine in order to protect the turbocharger. If none of the limits have been exceeded, then the system operates the turbocharger to provide the desired air mass flow to the engine in order to maximize engine performance.

In one form of the invention, a system for controlling a turbocharger supplying air to an internal combustion engine is disclosed, the system comprising: a combustion manager operative to determine a desired air mass rate based upon a current operating point of the engine; an air system manager operative to determine an air mass rate error as a difference between the desired air mass rate and an actual air mass rate of the engine; and a turbo manager operative to control an operating state of the turbocharger so as to minimize the air mass rate error.

In another form of the invention, a system for controlling a turbocharger supplying air to an internal combustion engine is disclosed, the system comprising: a combustion manager operative to determine a desired air mass rate based upon a current operating point of the engine; an air system manager operative to determine an air mass rate error as a difference between the desired air mass rate and an actual air mass rate of the engine; and a turbo manager operative to control an operating state of the turbocharger so as to minimize the air mass rate error while preventing the turbocharger from maintaining a turbocharger shaft speed in excess of a first predetermined limit and while preventing the turbocharger from maintaining a turbocharger temperature in excess of a second predetermined limit.

In another form of the invention, a method for controlling a turbocharger supplying air to an internal combustion engine is disclosed, comprising the steps of: a) determining a current operating point of the engine; b) determining a desired air mass rate based upon the current operating point; c) determining an actual air mass rate of the engine; d) determining an air mass rate error as a difference between the desired air mass rate and the actual air mass rate; and e) controlling an operating state of the turbocharger so as to minimize the air mass rate error.

In another form of the invention, a method for controlling a turbocharger supplying air to an internal combustion engine is disclosed, comprising the steps of: a) determining a current operating point of the engine; b) determining a desired air mass rate based upon the current operating point; c) determining an actual air mass rate of the engine; d)

determining an air mass rate error as a difference between the desired air mass rate and the actual air mass rate; and e) controlling an operating state of the turbocharger so as to minimize the air mass rate error while preventing the turbocharger from maintaining a turbocharger shaft speed in excess of a first predetermined limit and while preventing the turbocharger from maintaining a turbocharger temperature in excess of a second predetermined limit.

In another form of the invention, a method for controlling a turbocharger supplying air to an internal combustion engine, is disclosed, comprising the steps of: a) empirically determining a desired operating state of the turbocharger for any chosen engine speed and commanded fueling rate; b) storing the empirically determined operating states as a function of engine speed and commanded fueling rate in a lookup table; c) measuring a current engine speed and a current commanded fueling rate of the engine; d) retrieving a desired operating state of the turbocharger from the lookup table based upon the current engine speed and the current commanded fueling rate; and e) setting the turbocharger to the desired operating state determined at step (d).

DETAILED DESCRIPTION OF THE PREFERRED EMBODIMENT

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
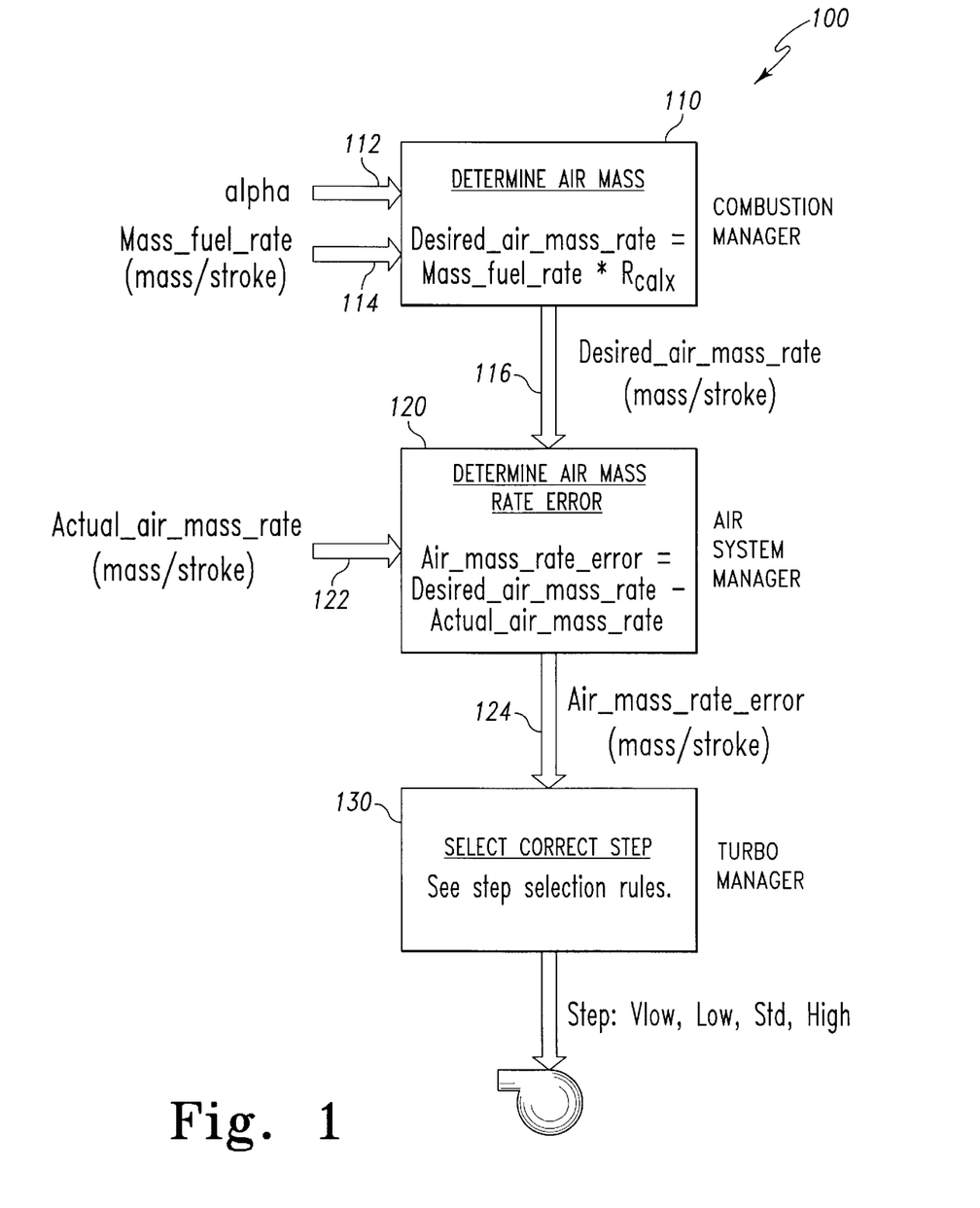
FIG. 1 is a schematic block diagram of the system of a preferred embodiment of the present invention, including a combustion manager, an air system manager, and a turbocharger manager.

Referring to FIG. 1, a preferred embodiment of the present invention is illustrated in schematic block diagram form and indicated generally at 100. In the preferred embodiment, the system 100 is implemented as part of the engine control module (ECM) of a turbocharged engine. As is known in the art, an ECM is typically a microprocessor based system that receives input from various sensors regarding the current operating state of the engine and/or vehicle, uses this input information to calculate desired changes in the operating state of the engine, and then produces various control outputs which are operative to change the operating state of the engine. The control system 100 of the present invention is designed to control the operation of an engine turbocharger, with a particular emphasis on operation of the turbocharger in such a way as to prevent turbocharger operating states that are potentially damaging to the turbocharger and/or the engine.

The system 100 comprises a combustion manager 110, and air system manager 120, and a turbo manager 130. Together, these three subsystems of the system 100 manage the engine turbocharger to deliver the appropriate air mass flow to the engine in order to maximize engine performance and also to protect the turbocharger from excessive shaft speed and excessive turbine inlet temperature. In order to do this, it is desirable to know three control parameters; namely, the existing air mass flow through the engine, the turbocharger shaft speed, and the turbine inlet temperature. However, sensors to directly measure these three parameters are relatively expensive. Thus, a preferred embodiment of the present invention utilizes other (typically existing) sensor inputs from the engine in order to calculate these three values.

The combustion manager 110 is responsible for determining the required air mass rate (mass of inlet air per engine stroke) which will optimize engine performance based upon the existing environmental operating conditions. These environmental conditions are determined from other sensor inputs, such as engine speed, vehicle speed, fueling rate, and ambient pressure. From these inputs, a desired air-to-fuel ratio (A/F) is determined.

The combustion manager 110 preferably uses an additional input alpha 112, which is a variable produced by another portion of the ECM control program and is designed to indicate whether the vehicle is currently being operated in an urban or a rural environment. This can be important in determining the timing of file injection to the engine, and is easily determined by the ECM by analyzing various parameters such as engine speed, vehicle speed, and fueling rate in order to determine whether the vehicle is exhibiting frequent stop-and-go activity (urban environment) or whether the vehicle is being operated in a steady state condition (rural or highway environment). The use of the alpha input 112 is described in greater detail hereinbelow with respect to FIG. 2. The combustion manager 110 further receives an input 114 comprising the mass fuel rate of the engine (mass of fuel per engine stroke). As is known in the art, the mass fuel rate is easily determined by examining the percentage of maximum fueling being delivered to the engine at any given engine speed. A desired air mass rate is then calculated by the combustion manager 110 from the target A/F ratio by multiplying this ratio by the current mass fuel rate. The desired air mass rate 116 is then passed as an input to the air system manager 120 portion of the system 100.

As discussed in greater detail hereinbelow with respect to FIG. 3, the air system manager 120 is responsible for calculating the air mass rate error between the desired air mass rate 116 and the actual air mass rate 122. The actual air mass rate 122 can be measured using an air mass flow meter, as is done on most gasoline-powered automobile engines today. However, the actual air mass rate 122 is preferably calculated in the present invention from information produced by other engine sensors. The actual air mass rate 122 may be calculated from the engine speed, the engine displacement volume, the intake manifold pressure, the intake manifold temperature, and the engine volumetric efficiency. A table is incorporated into the ECM memory giving empirical data for engine volumetric efficiency versus engine speed and fuel rate. The air mass rate error 124 is then calculated as the desired air mass rate 116 minus the actual air mass rate 122 and is passed as an input to the turbo manager 130.

As described in greater detail hereinbelow with respect to FIG. 4, the turbo manager 130 is responsible for controlling the engine turbocharger to minimize the air mass rate error and to protect the turbocharger from excessive shaft speed and excessive turbine inlet temperature. In a preferred embodiment of the present invention, the turbo manager 130 controls a four-step wastegate turbocharger. Minor variations in this control scheme, which will be apparent to those having ordinary skill in the art after reading the system description presented herein, may be necessary for controlling other turbocharger designs, such as a variable geometry turbocharger.

The protection modes of the turbo manager 130 have higher priority in the system 100 than does the engine performance control function of the turbo manager 130. First, turbocharger shaft speed is checked against a programmable limit value. If this limit is exceeded, operation of the turbocharger is adjusted to bring the speed under control. Next, the turbine inlet temperature is checked against a second programmable limit value. If the turbine inlet temperature exceeds the programmable limit, the turbocharger operation is adjusted in order to bring the inlet temperature under control. If these programmable limits are still exceeded after adjusting the turbocharger to protect against excessive shaft speed or turbine inlet temperature, then the fueling to the engine is derated until the situation is corrected. If, on the other hand, there are no violations of the turbocharger protection limits, then the turbocharger is adjusted in order to minimize the air mass rate error.

Figure 2:
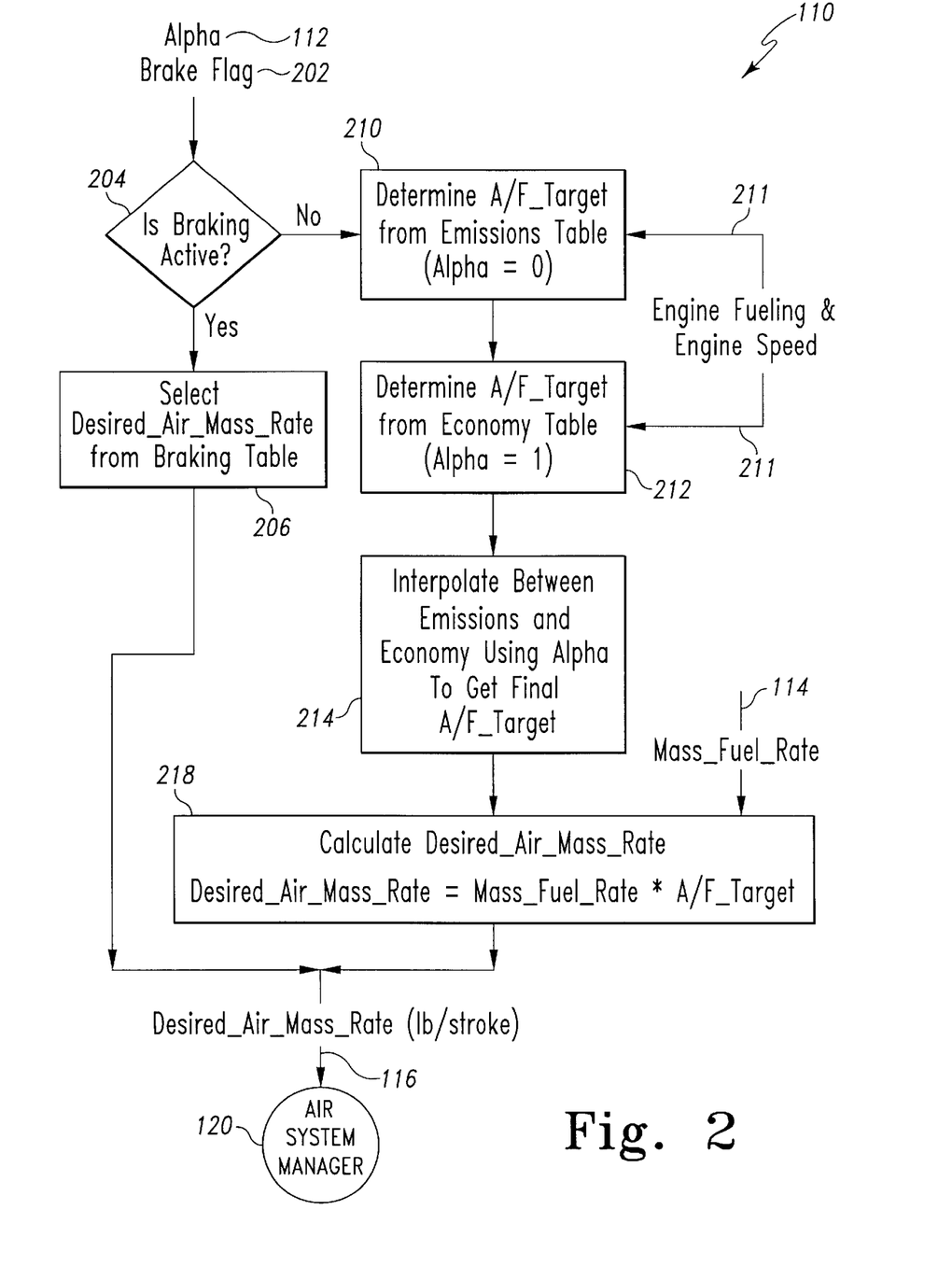
FIG. 2 is a schematic flow diagram of the combustion manager of FIG. 1.

Referring now to FIG. 2, there is illustrated a schematic block diagram of a preferred embodiment of the combustion manager 110. Inputs to the system 110 include the alpha input 112 and the mass fuel rate 114, as well as a brake flag 202 which indicates whether or not the vehicle is currently being braked. Decision block 204 examines the brake flag 202 in order to determine if braking is currently active (i.e., no fuel being delivered to the engine).

If decision block 204 indicates that braking is currently active, then the process proceeds to step 206 which selects the desired air mass rate from a table stored in a computer memory associated with the ECM. The desired air mass rate values contained in this table are empirically determined for various engine operating states and are designed to supply as much air as possible to the engine (and thereby produce as much compression braking as possible) without violating certain physical constraints of the engine. The desired air mass rate is then delivered as the input 116 to the air system manager 120 (see FIG. 3).

If decision block 204 determined that braking is not active, then the combustion manager proceeds to step 210 in order to begin a calculation of the desired air mass rate based upon the current fueling conditions of the engine. Block 210 determines the target A/F ratio, based upon current engine fueling and engine speed input data 211, that would be desired if the alpha input 112 were zero (i.e., the vehicle is operating in an urban environment). This value for the desired A/F ratio is derived from a table of values which are selected to reduce the emissions produced by the engine for any given combination of engine filling and engine speed. The process then continues at block 212, in which the desired A/F ratio is determined for an alpha input 112 of 1, corresponding to the vehicle operating in a rural or highway environment. The A/F ratio selected at block 212 is from a table of stored values which are designed to produce maximum fuel economy for any given engine fueling condition and engine speed.

In practice, the value of the alpha input 112 can be any fractional number between 0 and 1. Blocks 210 and 212 determine the A/F ratio when alpha is equal to 0 and 1, respectively, and block 214 then interpolates between these values in order to find a value which corresponds to the actual alpha input 112. This gives the true desired A/F ratio for the current vehicle operating conditions, which is passed to the block 218 in order to be used in the calculation of the desired air mass rate. The mass fuel rate input 114 is also supplied to block 218, and the desired air mass rate is calculated as the mass fuel rate 114 times the desired A/F ratio determined at block 214. This desired air mass rate is then passed as input 116 to the air system manager 120.

Figure 3:
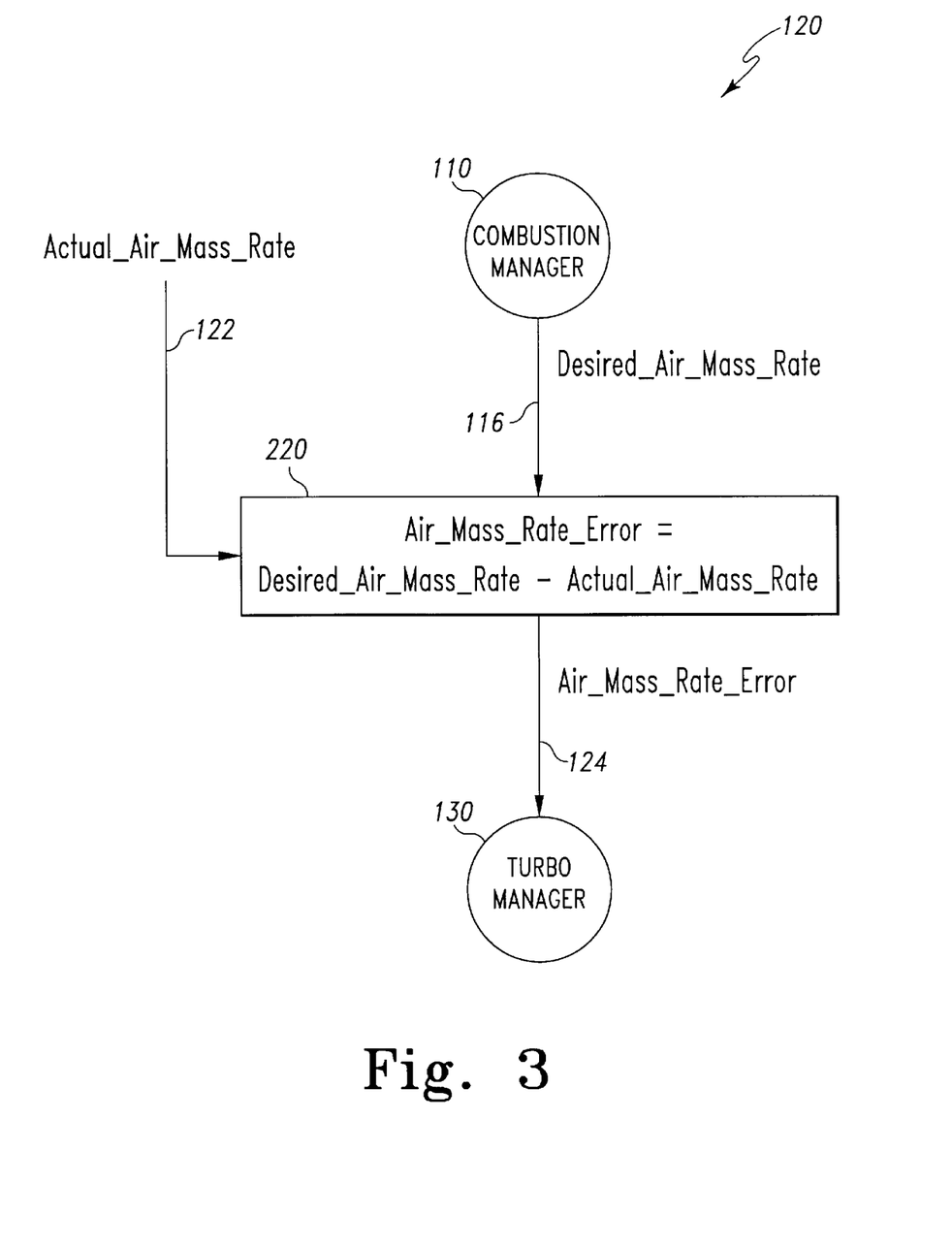
FIG. 3 is a schematic flow diagram of the air system manager of FIG. 1.

Referring now to FIG. 3, there is illustrated a schematic block diagram of a preferred embodiment of the air system manager 120. The air system manager 120 receives as inputs the desired air mass rate 116 from the combustion manager 110, and the actual air mass rate 122. The block 220 then calculates the air mass rate error as the desired air mass rate 116 minus the actual air mass rate 122. This air mass rate error is passed as input 124 to the turbo manager 130.

Figure 4:
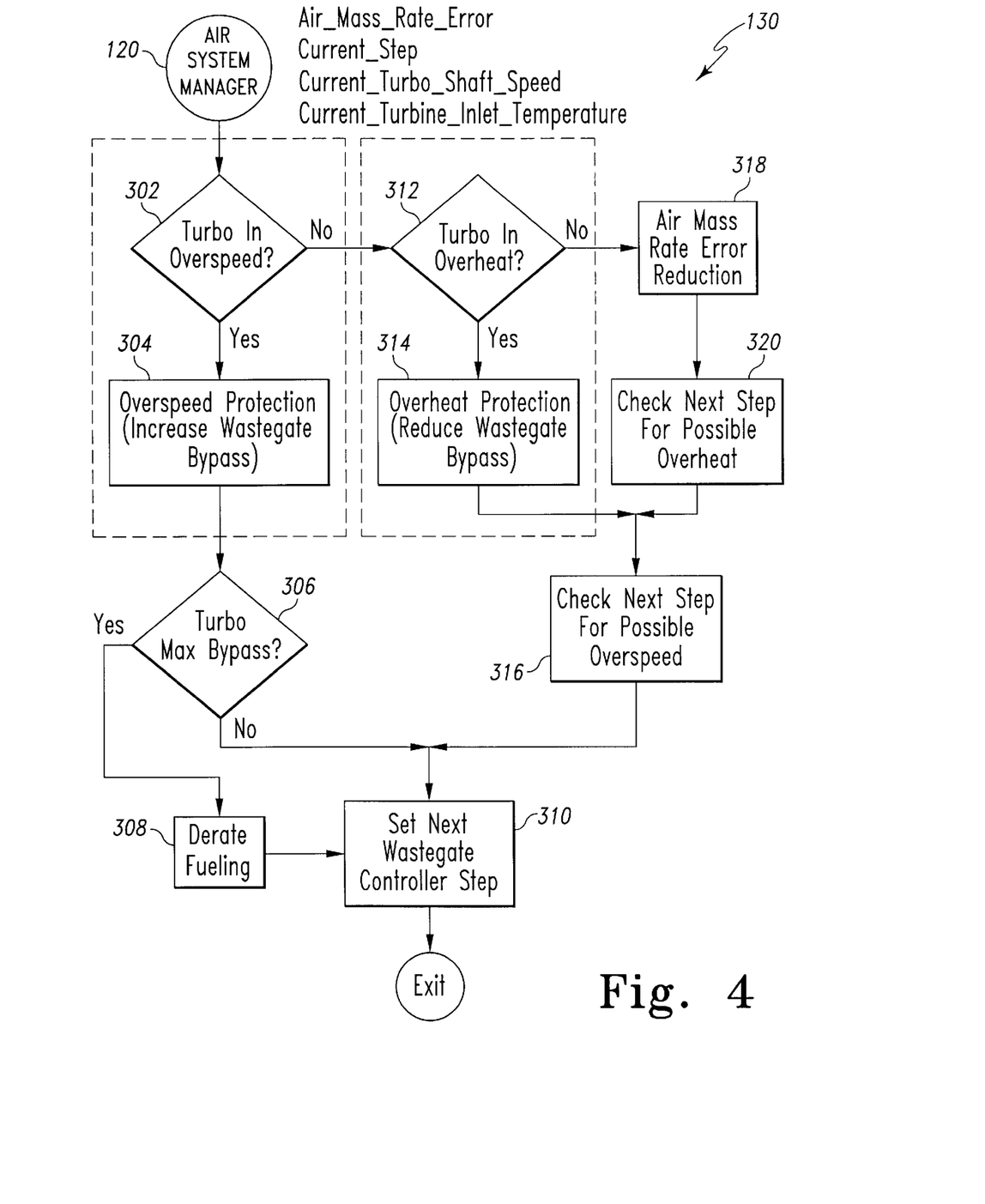
FIG. 4 is a schematic flow diagram of the turbocharger manager of FIG. 1.

Referring now to FIG. 4, there is illustrated a schematic block diagram of a preferred embodiment of the turbo manager 130. The function of the turbo manager 130 is to alter the operation of the turbocharger in order to reduce the air mass rate error to 0, while at the same time protecting the turbocharger from excessive shaft speed and excessive turbine inlet temperature. The turbo manager 130 illustrated in FIG. 4 is configured to control a wastegate turbocharger having a four-step wastegate. The inputs to the turbo manager 130 comprise the air mass rate error 124, as well as an indication of which of the four wastegate steps is currently implemented, the current turbocharger shaft speed, and the current turbocharger turbine inlet temperature. The turbocharger shaft speed may be measured directly by a sensor, however, in the present invention the turbocharger shaft speed is calculated from other engine sensor information and turbocharger component information stored in the ECM. The ECM memory contains a map of the turbocharger compressor performance which expresses compressor speed versus compressor pressure ratio and compressor air flow rate (the speed and air flow rate are actually expressed in corrected values which are adjusted according to compressor inlet temperature and pressure, as is known in the art, thereby allowing the use of just one map for any compressor operating condition). The compressor pressure ratio can be calculated from engine intake manifold pressure, ambient pressure, and intake and after-cooler restriction values (which are calculated from engine air flow and empirical constants stored in the ECM). The compressor corrected air mass flow can be calculated from engine air flow, ambient pressure, and ambient temperature. Once the pressure ratio and corrected air flow are calculated, a lookup table in the ECM memory is used with the compressor map to calculate the compressor speed (and thus the turbocharger speed).

The turbocharger turbine inlet temperature can be measured directly with a sensor, but practical production systems to do this are not currently in widespread use. In the preferred embodiment, the turbine inlet temperature is calculated from an equation stored in the ECM memory which is based upon empirical data for the particular turbocharger used. The equation for turbine inlet temperature is a function of engine speed, air/fuel ratio, intake manifold temperature, and fuel injection timing. The functional dependence of the inlet temperature upon these quantities can be modified in the ECM memory for any type of engine/turbocharger configuration.

The highest priority function for the turbo manager 130 is to protect the turbocharger from excessive shaft speed. Consequently, the first step in the turbo manager 130 is the decision block 302 which compares the current turbocharger shaft speed with a programmable limit value. If the current turbocharger shaft speed exceeds this programmable limit value, then block 304 determines which wastegate step should be commanded of the turbocharger in order to reduce the turbocharger overspeed condition. This is done by increasing the wastegate bypass, which reduces the amount of exhaust gases which are fed to the turbocharger turbine, thus allowing the turbocharger to slow its shaft rotational speed.

The turbo manager 130 next proceeds to decision block 306 which determines if the turbocharger is already set for maximum wastegate bypass. If so, then it is not possible to command any further increase in wastegate bypass from the turbocharger, and alternate means must be taken in order to reduce the turbocharger shaft speed. This is done at block 308, which commands a derating of the fueling being commanded of the engine fuel injection system. The amount of derating applied to the fueling command is selected from a previously determined altitude derating table, which artificially sets the apparent ambient pressure to a level lower than the actual ambient pressure, thereby causing the portion of the ECM which determines the fueling command to the engine to select a lower value than it otherwise would. This lowered apparent ambient pressure value is reset at vehicle keyoff. Other methods for derating the engine fueling command will be apparent to those having ordinary skill in the art. The turbo manager 130 is then exited in order to allow the ECM to execute its other functionalities. If the decision block 306 determines that the turbocharger is not currently set for maximum wastegate bypass, then the process will continue to block 310 which commands the turbocharger to implement the wastegate bypass step determined at block 304. The turbo manager 130 is then exited.

If the decision block 302 determines that the turbocharger is not in an overspeed condition, then the turbo manager 130 next determines whether the turbocharger is overheating. Decision block 312 compares the current turbine inlet temperature with a predetermined limit value. If the current turbine inlet temperature exceeds this predetermined limit value, then overheat protection is implemented at block 314 by reducing the amount of wastegate bypass. The block 314 thus determines which of the four wastegate settings should be implemented, based upon the current wastegate setting, in order to achieve this overheat protection. This will increase the amount of exhaust gases flowing across the turbocharger turbine, thus increasing their speed and providing more air to the engine with the same amount of fuel. This will cause a lowering of the engine temperature.

After block 314 determines the desired wastegate bypass step, block 316 determines whether that desired setting will produce a possible turbocharger overspeed condition. This is determined by looking at a record of what occurred the last time that the turbocharger was switched to this setting. The inclusion of block 316 prevents the turbo manager 130 from oscillating between settings which alternatingly produce overspeed and overheating conditions. There is a predetermined time limit associated with the block 316, such that it only looks at prior settings that were used within a predetermined prior time frame, this time frame being a programmable limit of the turbo manager 130. The process then proceeds to block 310 which implements the desired wastegate bypass step (if not overruled by block 316) and the turbo manager 130 is then exited.

If decision block 312 determines that the turbocharger is not overheating, then the turbo manager 130 proceeds to step 318 which adjusts the turbocharger wastegate setting in a manner designed to reduce the value of the air mass rate error 124. The desired wastegate setting is determined from a lookup table which contains the desired turbocharger wastegate step setting for any particular air mass rate error, engine speed and engine fueling. For example, the lookup table may command that no change should be made to the turbocharger wastegate if the air mass rate error 124 is within a first range of values, that a one-step increase in the wastegate setting should be commanded if the air mass rate error 124 is within a second range of values, that a one-step decrease in the wastegate bypass setting should be commanded if the air mass rate error 124 is within a third range of values, etc. This lookup table is preferably empirically determined for the particular engine and turbocharger configuration being controlled by the turbo manager 130.

The air mass rate error reduction step 318 described above is a closed loop control for reducing the air mass rate error. Alternatively, an open loop control can be executed where the desired wastegate step is chosen directly from a lookup table associated with the ECM based upon any particular engine speed and commanded fueling rate. This obviates the need to sense or calculate the air mass rate error. The wastegate state table in the ECM is generated from empirical engine data and permanently stored in the ECM memory. The ECM may thus be programmed for any particular engine/turbocharger combination, and the ECM may be further programmed to use either the state table or the above-described air mass rate error scheme.

The process then continues at step 320 which checks to make sure that the desired wastegate bypass setting will not produce an overheat condition. The block 320 accomplishes this task in an analogous fashion to the operation of block 316 described hereinabove. After checking for a possible overheat condition at block 320, the turbo manager 130 proceeds to block 316 to check for a possible overspeed condition with the desired wastegate setting. Block 310 will then implement the desired wastegate setting unless instructed not to do so by blocks 316 and 320. The turbo manager 130 is then exited.

As can be seen from the above description, the present invention provides a system and method for measuring any deficiencies in the air mass rate being delivered by the turbocharger to the engine, and for altering the turbocharger operation in order to minimize this air mass rate error. Furthermore, the turbo manager 130 of the present invention also operates to prevent turbocharger shaft overspeed conditions and turbocharger turbine inlet temperature excesses in order to prevent damage to the turbocharger. These protection functions of the turbo manager 130 have greater priority than the function of reducing the air mass rate error, thereby preventing operation of the turbocharger in a manner that would reduce the air mass rate error but place the turbocharger in danger of being destroyed.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A system for controlling a turbocharger supplying air to an internal combustion engine, the system comprising:
   a combustion manager operative to determine a desired air mass rate based upon a current operating point of the engine;
   an air system manager operative to determine an air mass rate error as a difference between the desired air mass rate and an actual air mass rate of the engine;

a turbo manager operative to control an operating state of the turbocharger so as to minimize the air mass rate error;

wherein the turbo manager is further operative to prevent the turbocharger from maintaining a turbocharger shaft speed in excess of a predetermined limit; and wherein the turbo manager is operative to increase a wastegate bypass amount of the turbocharger if the turbocharger shaft speed is in excess of the predetermined limit; and wherein the turbo manager is further operative to derate a fueling command to the engine if the wastegate bypass is at a maximum and the turbocharger shaft speed is in excess of the predetermined limit.

2. A system for controlling a turbocharger supplying air to an internal combustion engine, the system comprising:

a combustion manager operative to determine a desired air mass rate based upon a current operating point of the engine;

an air system manager operative to determine an air mass rate error as a difference between the desired air mass rate and an actual air mass rate of the engine; and a turbo manager operative to control an operating state of the turbocharger so as to minimize the air mass rate error;

wherein the turbo manager is further operative to prevent the turbocharger from maintaining a turbocharger temperature in excess of a predetermined limit;

wherein the turbo manager is further operative not to reduce the wastegate bypass amount if the reduced wastegate bypass amount previously caused a turbocharger shaft speed in excess of a second predetermined amount.

3. A system for controlling a turbocharger supplying air to an internal combustion engine, the system comprising:

a combustion manager operative to determine a desired air mass rate based upon a current operating point of the engine;

an air system manager operative to determine an air mass rate error as a difference between the desired air mass rate and an actual air mass rate of the engine; and a turbo manager operative to control an operating state of the turbocharger so as to minimize the air mass rate error while preventing the turbocharger from maintaining a turbocharger shaft speed in excess of a first predetermined limit and while preventing the turbocharger from maintaining a turbocharger temperature in excess of a second predetermined limit;

wherein the turbo manager is operative to increase a wastegate bypass amount of the turbocharger if the turbocharger shaft speed is in excess of the first predetermined limit; and wherein the turbo manager is further operative to derate a fueling command to the engine if the wastegate bypass is at a maximum and the turbocharger shaft speed is in excess of the first predetermined limit.

4. The system of claim 3, wherein the combustion manager, the air system manager and the turbo manager comprise a portion of an electronic engine control module.

5. The system of claim 3, wherein the combustion manager is further operative to determine a target air-to-fuel ratio based upon the current operating point of the engine, a mass fuel rate of the engine, and to then determine the desired air mass rate as the mass fuel rate multiplied by the target air-to-fuel ratio.

6. The system of claim 3, wherein the turbo manager is operative to reduce a wastegate bypass amount of the turbocharger if the turbocharger temperature is in excess of the second predetermined limit.

7. The system of claim 6, wherein the turbo manager is further operative not to reduce the wastegate bypass amount if the reduced wastegate bypass amount previously caused a turbocharger shaft speed in excess of the first predetermined limit.

8. A method for controlling a turbocharger supplying air to an internal combustion engine, comprising the steps of:

a) determining a current operating point of the engine;

b) determining a desired air mass rate based upon the current operating point;

c) determining an actual air mass rate of the engine;

d) determining an air mass rate error as a difference between the desired air mass rate and the actual air mass rate;

e) controlling an operating state of the turbocharger so as to minimize the air mass rate error;

f) controlling the operating state of the turbocharger so as to prevent the turbocharger from maintaining a turbocharger temperature in excess of a predetermined limit;

g) increasing a wastegate bypass amount of the turbocharger if the turbocharger shaft speed is in excess of the predetermined limit; and h) derating a fueling command to the engine if the wastegate bypass amount is at a maximum and the turbocharger shaft speed is in excess of the predetermined limit.

9. The method of claim 8, wherein step (b) further comprises the steps of:

b.1) determining a target air-to-fuel ratio based upon the current operating point;

b.2) determining a mass fuel rate of the engine; and b.3) determining the desired air mass rate as the mass fuel rate multiplied by the target air-to-fuel ratio.

10. The method of claim 8, wherein step (e) further comprises reducing a wastegate bypass amount of the turbocharger if the turbocharger temperature is in excess of the predetermined limit.

11. The method of claim 10, further comprising the step of:

g) preventing reduction of the wastegate bypass amount if the reduced wastegate bypass amount previously caused a turbocharger shaft speed in excess of a second predetermined limit.

12. A method for controlling a turbocharger supplying air to an internal combustion engine, comprising the steps of:

a) determining a current operating point of the engine;

b) determining a desired air mass rate based upon the current operating point;

c) determining an actual air mass rate of the engine;

d) determining an air mass rate as a difference between the desired air mass rate and the actual air mass rate;

e) controlling an operating state of the turbocharger so as to minimize the air mass rate error while preventing the turbocharger from maintaining a turbocharger shaft speed in excess of a first predetermined limit and while preventing the turbocharger from maintaining a turbocharger temperature in excess of a second predetermined limit;

f) reducing a wastegate bypass amount of the turbocharger if the temperature is in excess of the second predetermined limit; and g) preventing reduction of the wastegate bypass amount if the reduced wastegate bypass amount previously caused a turbocharger shaft speed in excess of the first predetermined limit.

13. The method of claim 12, wherein step (b) further comprises the steps of:
   b.1) determining a target air-to-fuel ratio based upon the current operating point;
   b.2) determining a mass fuel rate of the engine; and
   b.3) determining the desired air mass rate as the mass fuel rate multiplied by the target air-to-fuel ratio.

14. The method of claim 12, wherein step (f) further comprises increasing a wastegate bypass amount of the turbocharger if the turbocharger shaft speed is in excess of the first predetermined limit.

15. The method of claim 14, further comprising the step of:
   g) derating a fueling command to the engine if the wastegate bypass amount is at a maximum and the turbocharger shaft speed is in excess of the first predetermined limit.

* * * * *